(12) United States Patent
Beele

(10) Patent No.: US 8,006,447 B2
(45) Date of Patent: Aug. 30, 2011

(54) FIRE-RESISTANT FOAM, CONSTRUCTION ELEMENTS THEREFROM, SYSTEM FOR FIRE-TIGHT SEALING OF AN OPENING, AND METHOD FOR SEALING AN OPENING IN A WALL

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 951 days.

(21) Appl. No.: 10/553,428

(22) PCT Filed: Apr. 28, 2004

(86) PCT No.: PCT/NL2004/000280
§ 371 (c)(1),
(2), (4) Date: Nov. 13, 2006

(87) PCT Pub. No.: WO2004/096369
PCT Pub. Date: Nov. 11, 2004

(65) Prior Publication Data
US 2007/0066745 A1 Mar. 22, 2007

(30) Foreign Application Priority Data

Apr. 28, 2003 (NL) .................................. 1023279
Nov. 12, 2003 (NL) .................................. 1024770

(51) Int. Cl.
*C09K 21/00* (2006.01)
*E04C 2/52* (2006.01)
(52) U.S. Cl. .................. 52/232; 52/220.8; 428/314.4
(58) Field of Classification Search ........... 52/98, 220.8, 52/232, 198, 741.1; 521/82, 99; 428/317.9, 428/314.4
See application file for complete search history.

(56) References Cited

U.S. PATENT DOCUMENTS 3,513,114 A * 5/1970 Vandersall et al. ........... 523/179
3,574,644 A * 4/1971 Olstowski et al. ............ 523/200
(Continued)

FOREIGN PATENT DOCUMENTS

DE 3446503 A 8/1985
(Continued)

OTHER PUBLICATIONS

PCT International Search Report from International Application No. PCT/NL2004/000280 dated Sep. 8, 2004.
(Continued)

*Primary Examiner* — Khoi Tran
*Assistant Examiner* — Jason Holloway
(74) *Attorney, Agent, or Firm* — Wolf, Greenfield & Sacks, P.C.

(57) ABSTRACT

The invention relates to a fire resistant material based on an elastomeric foam. The invention further comprises a system for sealing off, at least during a fire taking place adjacent the wall, in an at least virtually entirely fire-tight manner, an open extending through that wall through which a transporting device comprising for instance a cable, duct or pipe has been fed, the system being provided with elements manufactured from a fire resistant material which expands under the influence of temperature increase. In addition, the invention extends to a wall in which such a system has been incorporated and a method for sealing off an opening extending through a wall through which at least one transporting device such as a cable, duct or pipe has been fed.

12 Claims, 14 Drawing Sheets

U.S. PATENT DOCUMENTS

| | | | | |
|---|---|---|---|---|
| 4,065,394 A * | 12/1977 | Pratt et al. | | 252/606 |
| 4,086,736 A * | 5/1978 | Landrigan | | 52/220.8 |
| 4,109,423 A * | 8/1978 | Perrain | | 52/1 |
| 4,136,707 A | 1/1979 | Gaillot et al. | | |
| 4,189,619 A * | 2/1980 | Pedlow | | 174/505 |
| 4,273,821 A * | 6/1981 | Pedlow | | 428/215 |
| 4,361,721 A | 11/1982 | Massey | | |
| 4,419,535 A * | 12/1983 | O'Hara | | 174/505 |
| 4,588,523 A * | 5/1986 | Tashlick et al. | | 252/606 |
| 4,663,204 A | 5/1987 | Langham | | |
| 4,740,527 A | 4/1988 | Von Bonin | | |
| 5,067,676 A * | 11/1991 | Beele | | 248/56 |
| 5,103,609 A | 4/1992 | Thoreson et al. | | 52/232 |
| 5,232,976 A | 8/1993 | Horacek et al. | | |
| 5,344,106 A * | 9/1994 | Beele | | 248/56 |
| 5,650,448 A * | 7/1997 | Wallace et al. | | 521/82 |
| 5,719,199 A * | 2/1998 | Wallace et al. | | 521/82 |
| 5,739,173 A * | 4/1998 | Lutter et al. | | 521/99 |
| 5,765,332 A * | 6/1998 | Landin et al. | | 52/396.01 |
| 5,974,750 A * | 11/1999 | Landin et al. | | 52/396.01 |
| 6,031,040 A * | 2/2000 | Horacek | | 524/495 |
| 6,153,668 A * | 11/2000 | Gestner et al. | | 523/179 |
| 6,153,674 A * | 11/2000 | Landin | | 524/35 |
| 6,228,914 B1 * | 5/2001 | Ford et al. | | 524/124 |
| 6,374,552 B1 * | 4/2002 | Price | | 52/169.12 |
| 6,484,463 B1 | 11/2002 | Fay | | |
| 6,521,834 B1 * | 2/2003 | Dykhoff et al. | | 174/66 |
| 6,536,169 B2 * | 3/2003 | Dykhoff | | 52/220.8 |
| 6,706,793 B2 * | 3/2004 | Abu-Isa et al. | | 524/409 |
| 6,732,481 B2 * | 5/2004 | Stahl, Sr. | | 52/406.1 |
| 6,809,129 B2 * | 10/2004 | Abu-Isa | | 523/179 |
| 6,820,382 B1 * | 11/2004 | Chambers et al. | | 52/232 |
| 6,901,711 B2 * | 6/2005 | Fay et al. | | 52/407.3 |
| 6,928,777 B2 * | 8/2005 | Cordts | | 52/220.8 |
| 7,087,670 B2 * | 8/2006 | Hoch et al. | | 524/495 |
| 7,114,303 B2 * | 10/2006 | Cordts et al. | | 52/220.8 |
| 2002/0178664 A1 * | 12/2002 | Dykhoff | | 52/220.8 |
| 2003/0125447 A1 * | 7/2003 | Hoch et al. | | 524/495 |
| 2004/0093814 A1 * | 5/2004 | Cordts et al. | | 52/220.8 |
| 2004/0093815 A1 * | 5/2004 | Cordts | | 52/232 |
| 2004/0231880 A1 * | 11/2004 | Beele | | 174/65 G |
| 2005/0179214 A1 * | 8/2005 | Beele | | 277/628 |
| 2006/0053710 A1 * | 3/2006 | Miller et al. | | 52/232 |

FOREIGN PATENT DOCUMENTS

| | | |
|---|---|---|
| DE | 42 34 374 A1 | 4/1994 |
| FR | 2 553 084 A1 | 4/1985 |
| GB | 1 500 912 | 2/1978 |
| GB | 2226033 A * | 6/1990 |
| GB | 22226033 A | 6/1990 |
| WO | WO 93/22814 | 11/1993 |
| WO | WO 03013658 A | 2/2003 |
| WO | WO 03067136 A | 8/2003 |

OTHER PUBLICATIONS

International Search Report from International application No. PCT/NL2005/000099 mailed on Oct. 21, 2005.

Office Action from U.S. Appl. No. 10/589,445 dated Jul. 19, 2010.

* cited by examiner

FIRE-RESISTANT FOAM, CONSTRUCTION ELEMENTS THEREFROM, SYSTEM FOR FIRE-TIGHT SEALING OF AN OPENING, AND METHOD FOR SEALING AN OPENING IN A WALL

The invention relates to a fire-resistant foam. The invention further relates to construction elements from such a foam. Such a foam and the elements manufactured from such foam are particularly suitable for feeding one or more cables, pipes, duct and the like in a sealing manner through an opening in a wall. It is noted that in this context, the term "wall" is understood to mean any separation between two spaces; the term comprises at least a wall, a ships' deck, a partition and the like.

Further, the invention relates to a system for sealing off, at least during a fire taking place adjacent a wall, in a virtually completely fire-tight, and preferably also smoke-tight and more preferably even completely medium-tight manner, an opening extending through this wall through which a transporting device comprising, for instance, a cable, pipe or duct has been fed, the system comprising elements which can be placed in the opening and which are manufactured from an elastic, fire-resistant material based on the foam according to the invention, which expands under the influence of temperature increase. The invention also relates to a method for sealing an opening extending through a wall through which, optionally, at least one transporting device such as a cable, pipe or duct has been fed, in which said foam or, rather, the construction elements manufactured therefrom are used. The invention also includes a wall with an opening extending through this wall through which, optionally, at least one transporting device such as a cable, pipe or duct has been fed and wherein the foam ensures the sealing.

Finally, the invention relates to a system which can serve as an at least temporary sealing of a feed-through in a wall, such that after the temporary sealing, in a simple manner, at least parts of the system can be removed for the purpose of feeding a transporting device comprising, for instance, a cable, pipe or duct, through the feed-through and such that during a fire taking place adjacent the wall during the temporary sealing, the feed-through is sealed off at least virtually entirely fire-tightly and preferably also smoke-tightly, the system being provided with elements which are manufactured from a fire-resistant material which expands under the influence of temperature increase, while the elements are manufactured from the foam according to the invention.

In international patent application WO-A-03/013658, a fire-resistant system and a method for feeding at least one cable, pipe or the like through an opening in a wall are described. This system consists of a casing provided in the wall. In the casing, first, rubber protective parts are placed which protective parts consist of rubber plates with air inclusion. These protective parts serve for heat-insulation. In the casing with the protective parts therein, cables, pipes or other ducts are encapsulated by a fire-resistant material.

The fire-resistant material mainly used in practice is based on polyurethane foam in which flame retardants or flame-resistant materials have been incorporated. When exposed to fire, the polyurethane foam reacts violently such that the heat insulating action of the foam has to be taken over rapidly by the protective rubber parts.

Polyurethane foam has a so-called intumescent or foaming action. This means that when heated, the liquefying polyurethane surface structure is blown up by pyrolytic (smoke) gases of the product. Much smoke is then formed and a thermally insulating layer from layered carbon material is formed, which layer has only a very small mechanical strength. The mechanical strength of the layered carbon structure is so limited that it is blown away through flame erosion. For that reason as well, it is required that foam products having an intumescent action are completely encapsulated.

These processes, for that matter, also occur when other plastics with an open pore structure are foamed. In general, nowadays, there is a discussion about so-called intumescent materials ("Dämmstoffbilder"), which form a layered carbon structure with the purpose of thermally protecting the material lying therebehind. This process is achieved by liquefying the surface of the material during heating. This liquid, viscous layer is then blown up by degassing the material. Much smoke is then released. More in detail, such intumescent materials have a high flue gas index.

The known foam materials have an open cell structure and are often hygroscopic, at least water absorbing or otherwise water uptaking. This can lead to, for instance, fungus formation in the foam and can give rise to corrosion of the material encapsulated by or in contact with the fire-resistant foam. Often, in a moist surrounding, this sealing, which contains foam materials, needs therefore to be puttied or to be sealed off from the moist surrounding in a different manner.

As stated, many if not all intumescent foams are sensitive to moisture uptake, causing degradation of the material. Recently, the long term behaviour of intumescent foams has been brought into disrepute, inter alia through this type of degradation, and it has even been proposed to subject this type of material to a yearly examination to verify whether the foam behaviour is still sufficient.

Depending on the type of foam, further, toxic agents can be formed when the foam is to carry out its fire-resistant action. Polyurethane for instance yields many, to a higher or lower degree, toxic nitrogen compounds while, optionally, even hydrocyanic acid can be formed.

In WO-A-03/013658 for that matter, as flame-resistant rubber, an elastomer or plastomer and substantially an ethylene vinyl acetate polymer is used, in which fire-resistant components have been incorporated.

In an improvement of the system described in WO-A-03/013658, the present inventor has researched flame-retardant polymeric materials in which cross-linkable polymers are used. When the polymers contain unsaturated bonds, such as polymers based on monomers with at least two double bonds, such as conjugated monomers and, for instance, 1,4-hexadiene, di-cyclopentadiene, and ethylidene norbornane, they can be mutually cross-linked by carrying out, for instance, a vulcanisation with sulphur. As is known, saturated polymers can be cross-linked with peroxides.

In these polymeric materials, fire-resistant and flame-retardant agents are incorporated and, in particular, aluminum hydroxide, flame-retardant plasticizers of the phosphate type. During processing, the material is subjected to the cross-linking reaction, thereby forming a porous structure. This material too, for that matter, has an intumescent nature.

According to the invention, a foam material has now been found which insulates so well that when exposed to fire, the foam structure remains intact for a long period of time. This insulating action is so good that the above-mentioned rubber protective parts are no longer required. As the rubber protective parts are heavy, by omitting these parts, a considerably lighter structure of the casing can suffice; what is more, a sealing is formed which is so good that, optionally, even the entire casing can be omitted. However, when the casing is omitted, naturally, the foam needs to remain partly enclosed to some extent, for instance by the wall material itself. The fact is that the expansion required for the action does need to be "controlled" to some extent.

More in particular, the invention relates to a fire-resistant material based on an elastomeric foam with a substantially closed cell structure, in which foam at least a crust forming, fire-retardant material and a pH neutralized graphite material have been incorporated.

Relative to the known fire resistant foams, the expansion of the foam takes place not so much towards the side at which the fire is present, but rather away from the fire. As a result, the material according to the invention remains available longer for the required action. This effect will be explained further.

In fact, the foam can be manufactured from any polymeric material appropriate for the formation of closed cells. Preferably, it is halogen-free and fire-retardant. More in detail, it can be manufactured from unsaturated polymers such as natural rubber, styrenebutadiene rubber and nitril butadiene rubber; but also from saturated polymers such as EPDM-rubber and preferably, from ethylene vinyl acetate (EVA). In order to form a foam from these polymers, the polymers are to be cross-linked, whereby the unsaturated polymers can be well cross-linked with, for instance, sulphur and sulphur donors, while the saturated polymers can be well cross-linked with, for instance, peroxides.

By adding and having chemical blowing agents, in particular blowing agents of the nitrogen type such as azodicarbon and hydrazine, expand these polymers, from these polymeric materials, a foam structure is obtained with a substantially closed cell structure. In this description and the following claims, "a substantially closed cell structure" is understood to mean a cell structure in which at least 60%, but more preferably at least 75% of the cells is closed. Based on EVA, a material can be obtained comprising closed cells for more than 80%.

In the foam, at least one crust-forming fire-retardant material is to be incorporated. To this end, highly suitably, borates conventionally used as fire retardants; plasticizers of the organic phosphate type such as trialkyl phosphates and triaryl phosphates, and in particular trioctylphosphate, triphenylphosphate and diphenyl cresyl phosphate; solid fire retardants such as ammonium polyphosphate, for instance Antiblaze MC®; and melamine polyphosphate (melapur 200) can be used. In a preferred embodiment, the crust forming fire retardant agent is ammonium polyphosphate or melamine phosphate. Most preferred is the use of melamine phosphate. These crust-formers are to be present in an amount high such that they form a fire-retardant crust. Although the skilled person knows these amounts and is certainly capable of determining these amounts, as a guideline, an amount of this agent is advised in the range of 2-20% by weight calculated on the weight of the foam. Preferably, 3-10% by weight of crust former is used, most preferably 4-8% by weight.

The second essential component in the foam according to the invention is pH neutralised graphite. This material expands when it is heated above approximately 200° C. As a rule, expanding graphite is obtained by intercalating graphite, wherein (most often) nitrogen or sulphur compounds slide between the graphite lattices; it is commercially available as, for instance, "Blähgraphit" of GK Kropfmühl, Hauzenberg, Germany. This material is prepared by treating graphite with, for instance, sulphuric acid or nitric acid. According to be invention, it has now been found that a pH neutralization of intercalated graphite ensures that the foam formation, and perhaps even the foam material itself is not adversely affected by possible acid residues, while furthermore no corrosion problems occur in material optionally sensitive to corrosion, contacting the foam. The pH neutralisation can be carried out, for instance, by washing thorough or by adding a sufficient amount of base material. Such a graphite is available under the name carbofoil of Cleanline products.

The graphite material preferably expands at a temperature above 200° C. As a rule, it is used in an amount of between 5 and 20% by weight calculated on the weight of the foam, more preferably in an amount of between 8 and 50% by weight and most preferably between 10 and 12% by weight.

In addition to the essential flame-retardant or fire-resistant components, also other fire retardants can be present. These too are highly preferably halogen-free. For instance, aluminium trihydrate, for instance Apyral 2E® or HN 336 of Huber can be present in large amounts, to 60% by weight, although preferably in an amount of between 25 to 50% by weight, as long as the ratio polymeric material to these other fire retardants does not exceed 1:2.

In a preferred composition, the foam consists of cross-linked EVA polymer, 20-40% by weight aluminium hydroxide, 5-20% by weight of pH neutralized graphite, 2-20% by weight of ammonium polyphosphate or melamine polyphosphate and to 10% by weight of plasticizer, dispersant, lubricant, colorant, anti-oxidizers, cross-linkers and other conventional auxiliary substances.

All admixtures in the foam, for that matter, should be initially present and be of a nature such that they are compatible with the closed cell structure of the foam. In other words: the admixtures should not act aggressively on the polymer matrix nor should they be initially present in a form which disturbs the structure of the foam, for instance in the form of too large particles.

Without wishing to be bound to any theory, it is assumed that the foam according to the invention derives its action from, on the one side, a chemical reaction leading to the formation of a crust on the side the fire is present, and, on the other side, from an expansion of both the gas captured in the closed cell structure under the influence of heat development associated with the fire and, optionally, expansion of the graphite. The expansion ensures a heat insulation behind the crust formation. The foam material according to the invention yields a material which, over time, moves away from the side the fire is present and also functioning as heat insulating layer. Due to the expansion occurring substantially away from the side the fire is present, the fire resistant foam according to the invention remains intact, and hence effective, longer.

In the foam according to the invention, the expansion is not or hardly accompanied by the formation of a large amount of flue gases. The action of the foam, accordingly, is not based on smoke development. The smoke index of the foam according to the invention is low while, as a rule, gases possibly formed are considerably less toxic than, for instance, the gases which are released with foams with an intumescent action, such as foam based on polyurethane.

Due to the substantially closed cell structure, the foam according to the invention substantially absorbs no water. Therefore, it is no longer necessary to apply a layer to the foam which seals off from the environment.

The foam according to the invention can be manufactured from polymeric material having a much higher self combustion than the sponge-like polyurethane materials which are conventionally used. Further, the foam according to the invention has a much greater mechanical strength so that it can well be made into construction elements. For instance, the material can be designed well in the shape of plates with grooves, which grooves allow breaking off or tearing off of strips. The latter is beneficial to the filling up of the feed-throughs in a wall, at least simplifies this process.

In addition, the closed cell structure effects a better mechanical memory action, so that pressure, built up within the feed-through, through compression of the foam parts, remains intact much longer than when a foam with an open pore structure is used.

Although not essential, after having been placed in the feed-through, the foam can be finished with a layer of, optionally, fire-resistant putty, in order to obtain a completely gastight and watertight fire-resistant feed-through.

As further elaborated hereinbelow in the description of the Figures, the foam is made to form a construction element, for instance in the form of sheets, plates, tiles, mats, profiles or strips. The designing phase can comprise, for instance, a heat-pressing or injection moulding step.

The following description of the Figures is particularly directed to a system for sealing off, at least during a fire taking place adjacent a wall, in a virtually completely fire-tight and preferably also smoke-tight, and more preferably even medium-tight manner, an opening extending through the wall through which opening, optionally, a transporting device comprising a cable, pipe or duct has been fed, the system being provided with elements manufactured from a fire-resistant material which expands under the influence of temperature increase. However, this does not mean that the invention is limited thereto. On the contrary, the invention also includes the use of the material according to the invention in floors, wall coverings, door strips and the like.

Preferably, the system is further designed such that after the system has been fixed in the opening, parts of the opening which are free from the transporting device are sealed off by the system.

The invention is presently elucidated with reference to a drawing. In the drawing.

In this description identical or corresponding parts have identical or corresponding reference numerals.

Figure 1:
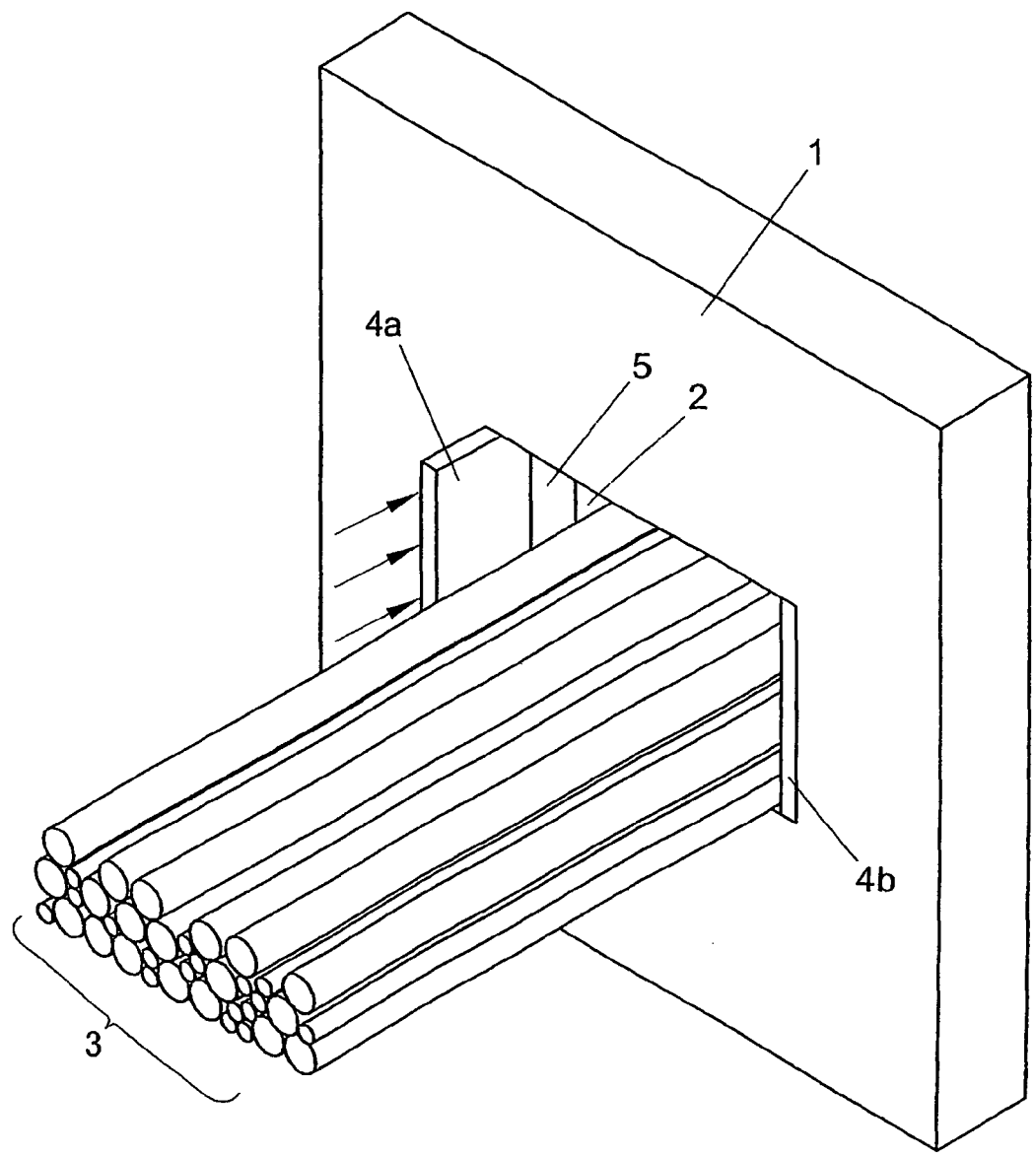
FIG. 1 shows a first phase of the first use of a system according to the invention.

FIG. 1 shows a part of a wall 1 with an opening 2 extending through this wall 1 through which opening at least one transporting device 3 has been fed. The transporting device can comprise, for instance, a cable, a duct or a duct. However, it is also possible that the transporting device comprises a plurality of cables, pipes or ducts. Such a transporting device can be used for transporting through the wall 1, for instance, a liquid or a gas when using a pipe, or, for instance electricity or light when using a cable or a duct. The system is provided with elements 4 placable in the opening 2 which are manufactured from a fire-resistant material, the foam according to the invention, which expands under the influence of a temperature increase. The system is designed such that, at least through mutual contact, contact with inner wall 5 of the opening 2, or contact with the transporting device 3, the elements 4 can be fixed in the opening 2 in a self clamping manner. In a first phase of a use of the system, preferably, against each upstanding inner wall 5 of the opening 2, substantially vertically directed plate-shaped elements 4a, 4b are provided. This can take place, for instance, by sliding the element 4a into the opening 2, as is represented with the aid the arrows indicated in the drawing. The wall can be manufactured, for instance, from concrete and the opening can be, for instance, a prefabricated opening or an opening provided in the concrete wall later. The wall can also be manufactured from other materials. Optionally, in the recess in the wall, a special casing can be provided.

Figure 2:
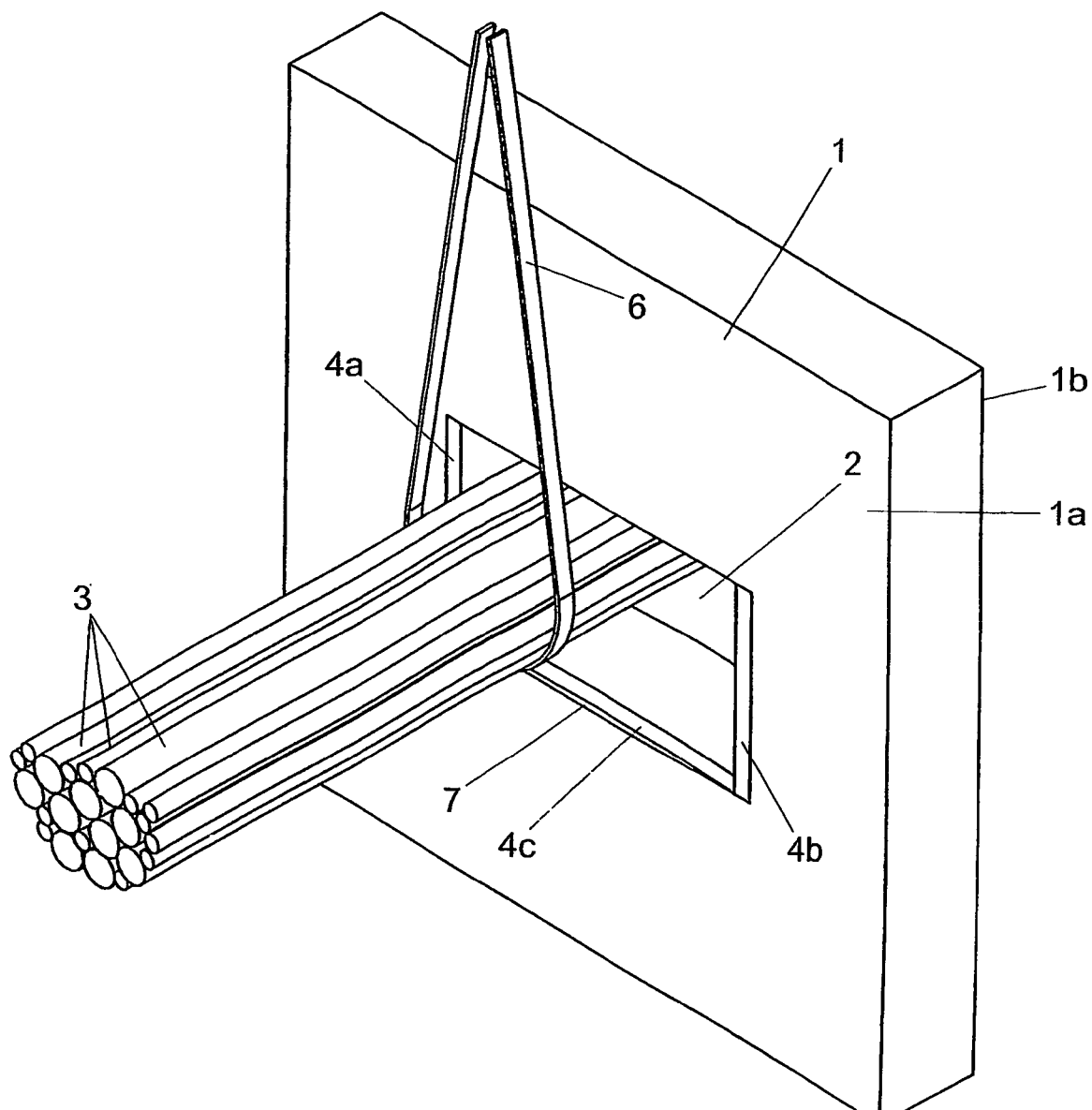
FIG. 2 shows a second phase of the first use of a system according to the invention.

In FIG. 2, a second phase of a use of the system according to the invention is represented. In this phase, the transporting device is hoisted upwards by, for instance, a hoisting band 6 from rope or rubber so that the transporting device comes free from the bottom wall 7 of the opening 2. In this situation, it is possible to place a plate-shaped element 4c horizontally on the bottom 7 of the opening 2. The element 4c can be designed such that the element is, in fact, slightly too large to fit flatly between the vertically directed elements 4a and 4b. This is no objection because, when the hoisting band 6 is removed, the transporting device 3 will rest on the element 4c and will compress the element 4c between the vertically directed elements 4a and 4b.

Figure 3:
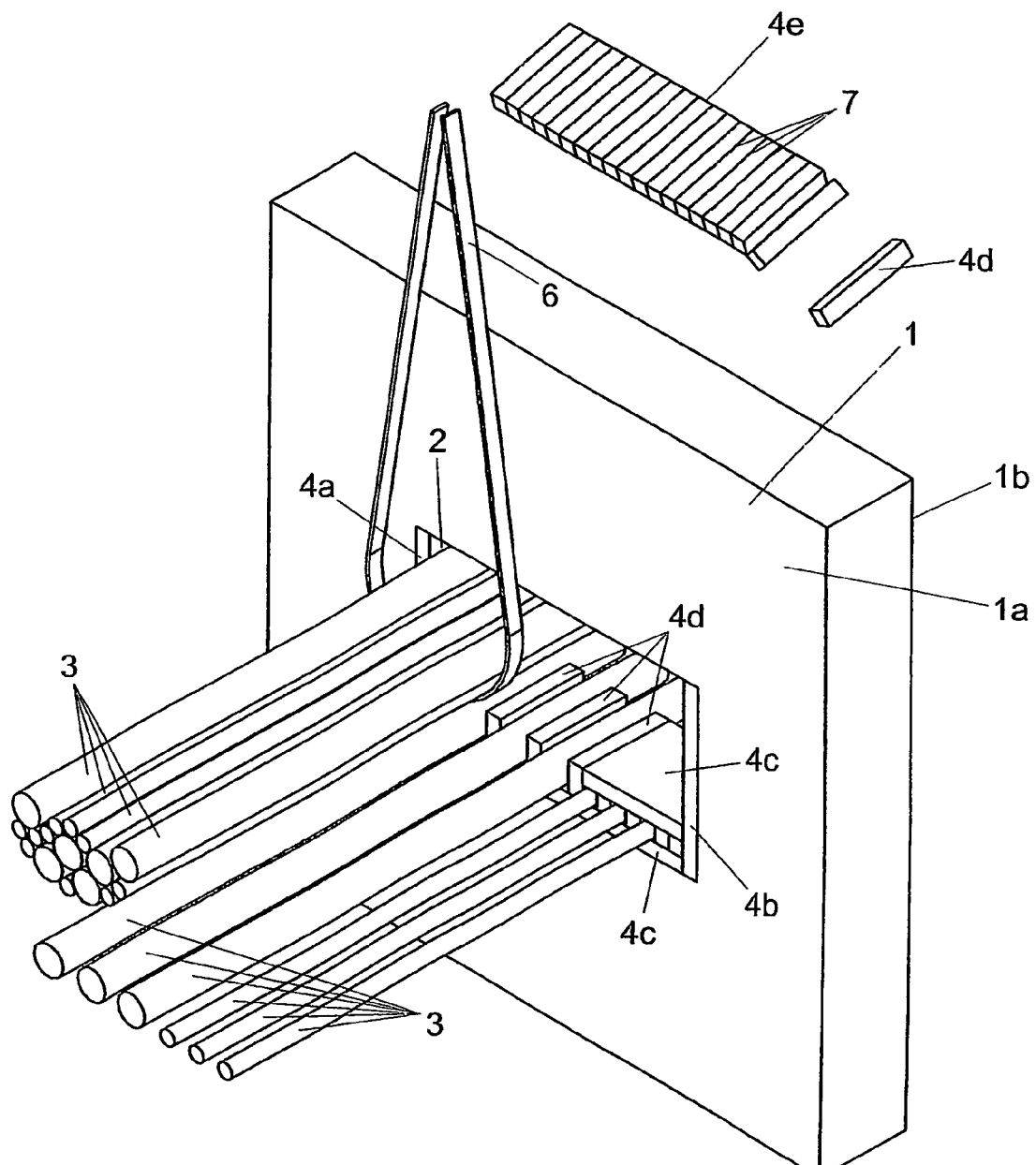
FIG. 3 shows a third phase of the first use of a system according to the invention.

In a third phase of the use of the system according to the invention shown in FIG. 3, each tube, cable or duct of the transporting device is separately embedded between elements of the system. The system can be designed such, at least for a part, that at least one of the elements 4d is a part of a plate-shaped material 4e. The at least one strip-shaped element 4d is detachable by breaking a connection along a groove or a line of weakening 7 which has been provided in the plate-shaped material 4d. With this, manufacturing and furnishing the system is simplified. At the location of the wall the opening of which is to be sealed off with the aid of the system, the elements can be taken from the plate-shaped element. The elements can be made to fit in situ, for instance with the aid of a knife or a pair of scissors.

The elements 4d are substantially of tube or beam-shape design and can be placed between the various transporting devices 3 in the opening 2 of the wall 1. In such a manner, transporting devices 3 can be embedded in an arrangement of elements 4c and 4d as is represented in FIG. 3. In this phase, it is advisable to use the hoisting band 6 for moving a number of transporting devices fed through the opening 2 upwards, below which a further plate-shaped element 4c is still to be placed horizontally.

Figure 4:
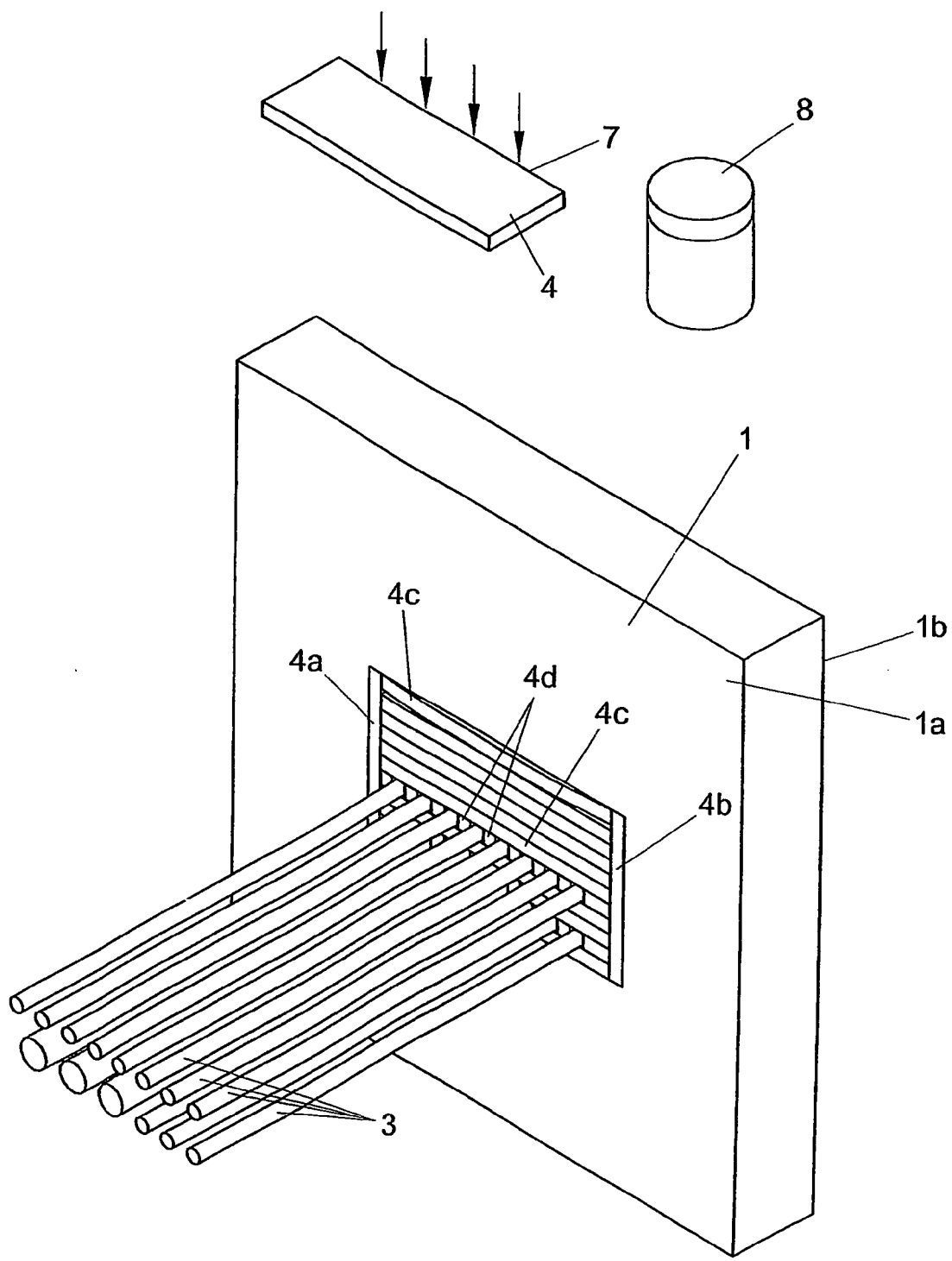
FIG. 4 shows a fourth phase of the first use of a system according to the invention.

FIG. 4 shows a fourth phase of a use of a system according to the invention. In this case, a large number of transporting devices 3 has already been embedded in an arrangement of elements 4c and 4d. Preferably, the system is also provided with a greasing means or a lubricant 8, for instance petrolatum, which can be applied to a surface 9 of each of the elements 4a, 4b, 4c, 4d.

Due to the lubricant, it is ensured that each element 4a, 4b, 4c, 4d to be placed in the opening can be easily positioned in the opening.

The stacking of plate-shaped elements 4c present above the transporting devices 3 can optionally be pressed-on, for instance with the aid of a press-on element such as a lath. An element 4c to be placed last in the opening is, once more, preferably designed such and/or preferably has dimensions such that it can be included in the opening, each time in a clamping manner, between the other elements, through contact with an inner wall of the opening 2, or through contact with the transporting devices. In particular when inserting this last, sealing element, the use of a lubricant is desired. As a rule, insertion of the last element is easiest by reducing the element, for instance by dividing it in two or three parts, by lubricating these parts with the lubricant or covering them otherwise, and to then insert these parts into the remaining opening.

Preferably, the elements have been designed such and/or are preferably dimensioned such that the system can be fitted virtually fittingly in the opening 2 within a volume bounded by a first outer surface 1a of the wall 1 and a second outer surface 1b of the wall 1 located opposite the first surface 1a. To this end, the dimensions of the elements, designed so as to be stackable, can be suitably chosen. However, it is also possible that the elements are, for instance, designed to be wound or rolled around the transporting device. In this case, an element can for instance be designed as a thin, elongated strip.

No additional auxiliary means need be present for fixing the elements in the opening. Providing the system in the opening can be done rapidly and efficiently. Further, no casing of the system provided in the opening is required. This saves costs. Further, as indicated, the system needs not occupy additional space in addition to the space which in any way is already taken up by the wall.

Figure 5:
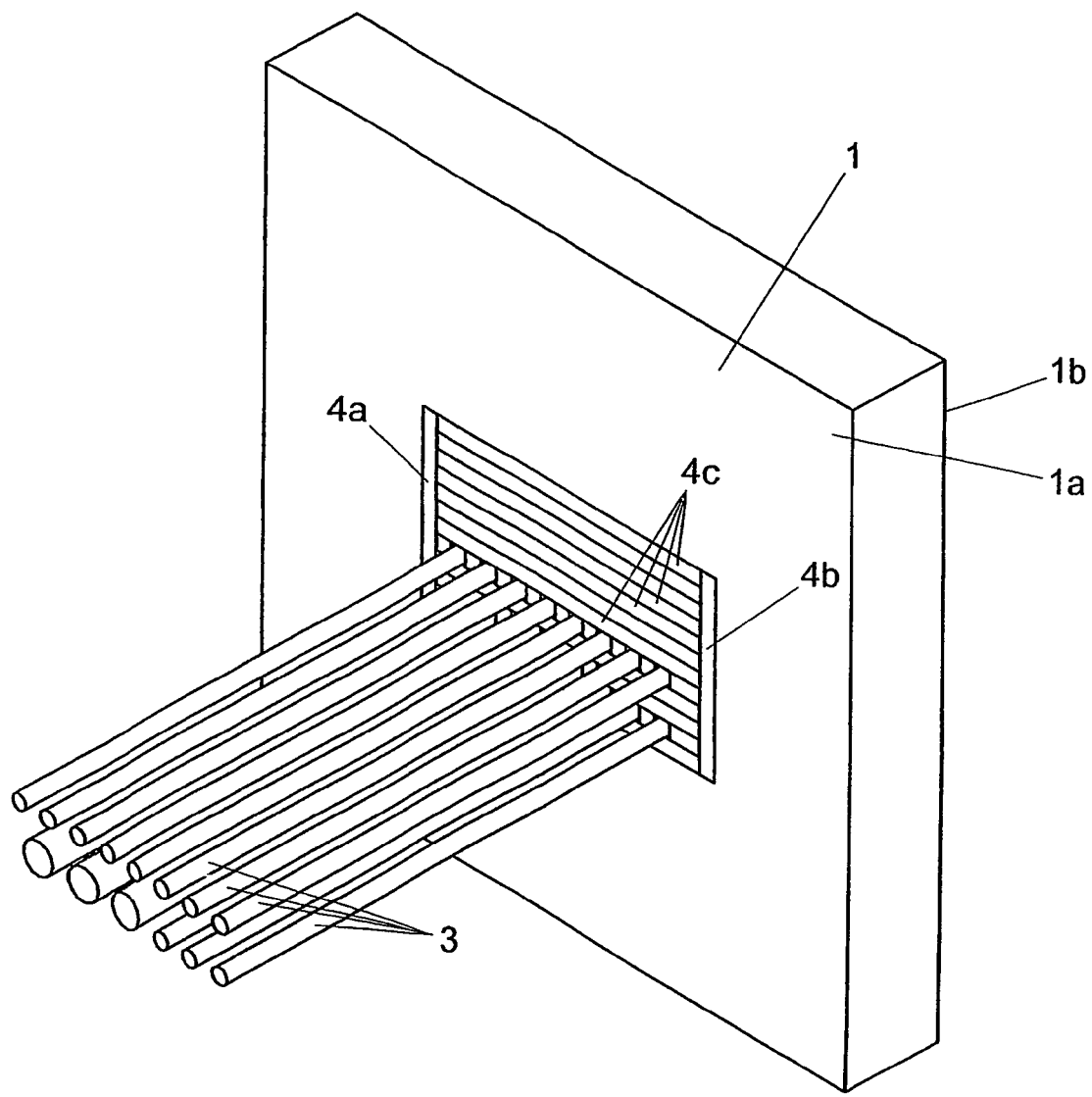
FIG. 5 shows a fifth phase of the first use of a system according to the invention.

FIG. 5 shows a fifth phase of a use of a system according to the invention. The system is designed such that after fixing the system into the opening, parts of the opening 2 which are free from the transporting device 3 are sealed off by the system. This offers the advantage that no further puttying of the opening with a flame extinguishing and/or liquid resistant agent is required. As a rule, for that matter, when the system according to the invention is not to allow any moisture such as water through, the use of a putty will be advisable. The system is designed such that after being fixed in the opening, the system is ready for use. With this too, the costs for providing the system are kept low.

A great advantage of the system according to the invention is that the system can be used completely independently of the thickness of the wall, while, furthermore, the minimum wall thickness required for resisting fire is to be observed. For instance, the standard for keeping a wall fire resistant for 2 hours is a thickness of 15 cm; and for keeping a wall fire resistant for 1 hour a thickness of 10 cm.

The system as represented in FIGS. 1-5 is designed such that the system can be fixed virtually fittingly in the opening within a volume bounded by a first outer surface 1a of the wall 1 and a second outer surface 1b of the wall 1 located opposite the first outer surface. However, the system can also be designed such that the system is in line with the first outer surface 1a, the second outer surface 1b or both outer surfaces 1a, 1b. It is also possible that the system is provided with a casing which, in use, is provided in or around the opening 2 as a frame. In that case, after having been placed in the opening, the system preferably projects slightly relative to the first outer surface 1a, the second outer surface 1b or both. Optionally, between the casing and the system, a gasket can be included. However, a casing is not necessary, as long as encapsulation of the foam is guaranteed. If use is made of a casing, then this casing can comprise a much lighter construction than the casing used in known systems. A casing can be helpful when sealing off the opening to flue gases.

Figure 6:
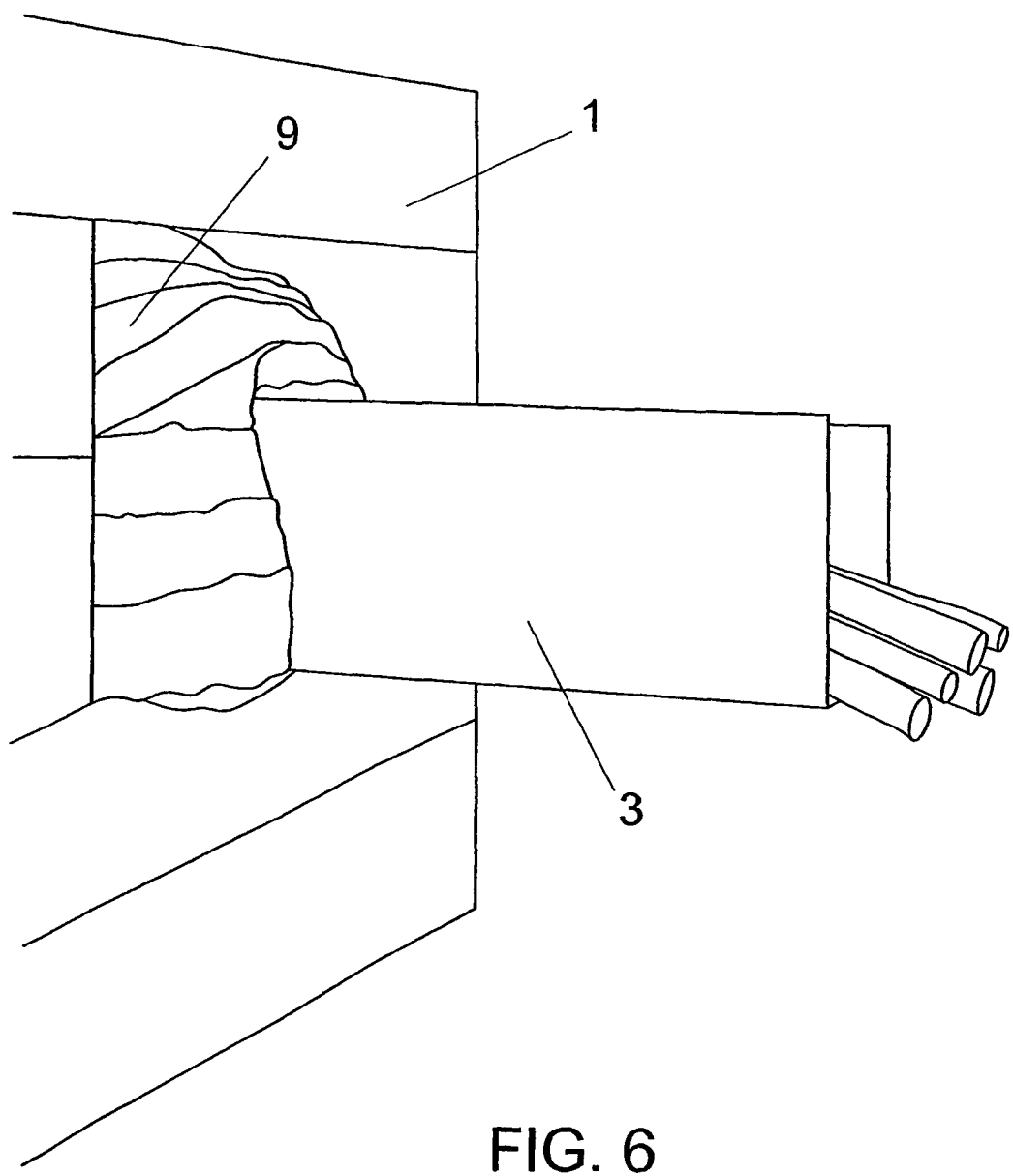
FIG. 6 shows a detailed representation of the first use of a system according to the invention after exposure to a high temperatures.

Further, FIG. 6 shows a detailed representation of a use of a system according to the invention after exposure to high temperatures. The side which is shown in FIG. 6 is the side directly exposed to the high temperatures. The crust 9 formed due to the high temperature with the aid of the system seals the opening off at the high temperature side of the wall. In this case, the transporting device comprises a hollow beam through which pipe, cables or ducts are fed. Preferably, the cavities of such feed-throughs are, furthermore, also filled with the foam according to the invention.

Figure 7:
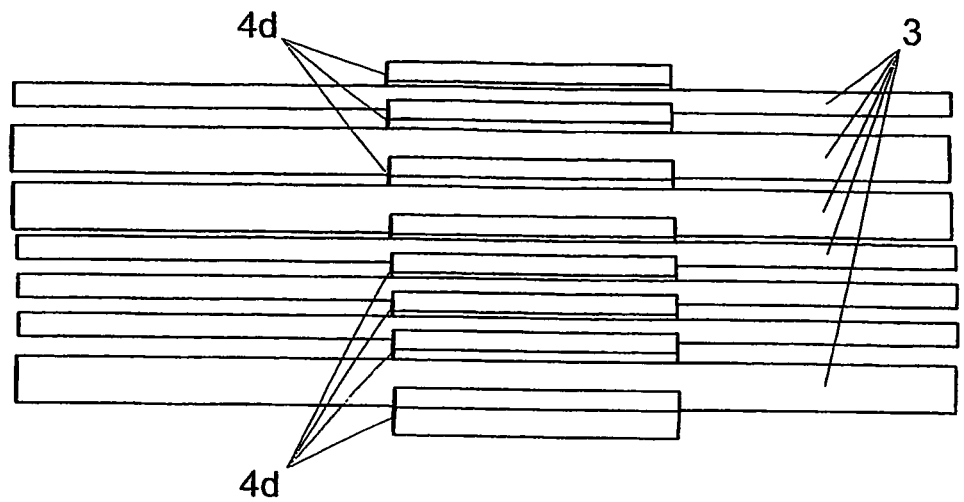
FIG. 7 shows a first phase of an alternative to the first use of the system according to be invention.

Further, FIG. 7 shows a first phase of an alternative use of the system according to the invention. In this case, the system is provided between and/or around the transporting devices by placing the elements 4 between and/or around the transporting devices 3.

Figure 8:
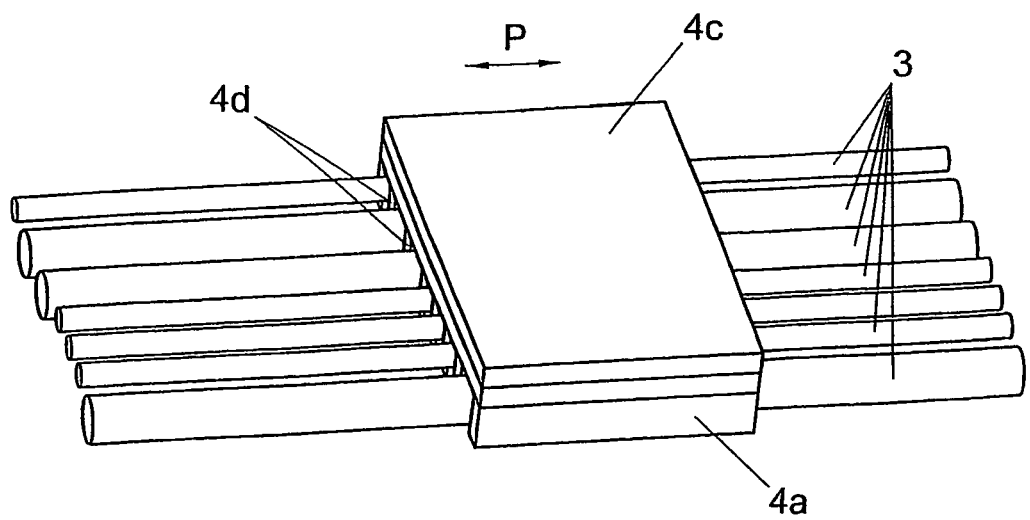
FIG. 8 shows a second phase of the alternative to the first use of the system according to the invention.

FIG. 8 shows a second phase of the alternative use shown in FIG. 7. In this case, the system is provided around the transporting devices such that the elements, in use, at least through mutual contact, contact with the inner wall of the opening or through contact with transporting devices, can be fixed in the opening in a self-clamping manner. The transporting devices shown in FIG. 8 with the system provided therearound can be included in an opening by sliding through an opening in the direction of arrow P. However, it is also possible that a wall is built around the system shown in FIG. 8. Although, in particular, plate-shaped and strip-shaped elements are shown, no shape is precluded. Elements with a special profile, such as for instance O-shaped, U-shaped or cross-shaped profiles, are also understood to each fall within the framework of the invention.

Figure 9:
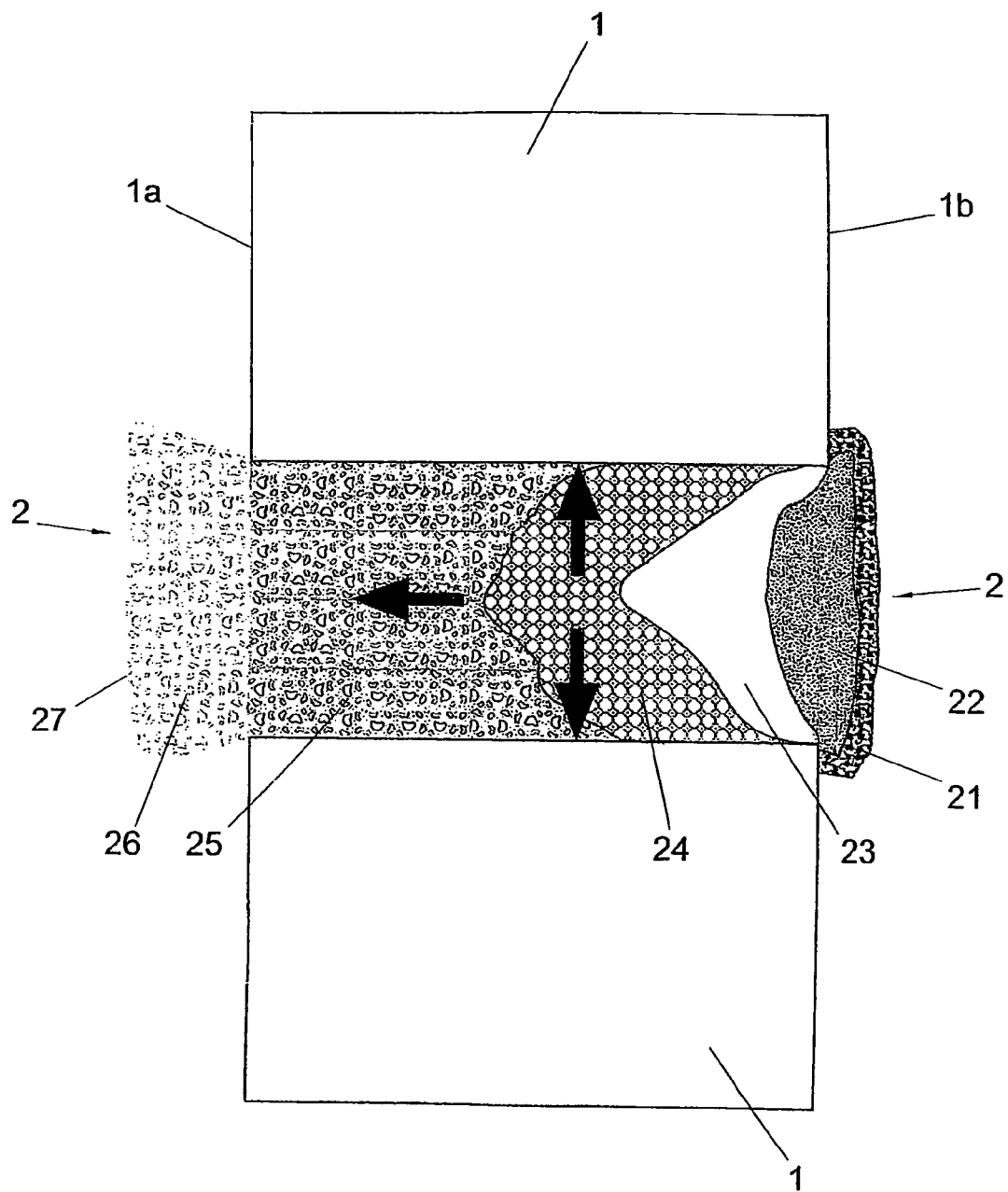
FIG. 9 shows a cross-section of a wall with an opening in which a material according to the invention has been provided.

Without wishing to be bound to any theory, FIG. 9 shows an illustration of a possible action of a material according to the invention when exposed to fire in a space also bound by outer surface 16, a cross-section of a wall 1 with an opening 2 in which at least one element manufactured from a material according to the invention is provided. For the sake of clarity, the transporting device is not shown.

A part 21 of the material present at the side the fire is present will first slightly expand and then be transformed into a crust 21. This crust forms a shield against the effect of the fire. In many cases, the crust 21 will seal off the remaining amount of material in the opening 2 from the fire.

It is possible that in a zone 22 the material according to the invention in a fine, granular substance comprises graphite which is held together by plasticized polymer. This zone 22 can form a second barrier to the fire, optionally while maintaining some thermal insulation. In a zone 23, cells exposed to high temperatures can optionally still break open. However, the parts of the material located further away from the outer surface 1b will maintain the closed cell structure and contribute to the insulating character of the material in the opening. The zone 23 forms, as it were, a retarding barrier.

A part 24 of the material in the opening 2 forms a zone 24 in which the closed cells can expand without breaking. In this zone, the material in the opening expands so that any cracks and the like that may be present are pressed closed. The zone 24 forms a so-called sealing barrier. Due to volume increase of the closed cells, a part 25 of the material in the opening will expand in the direction of the outer surface 1a which is not exposed to the fire and the high temperatures caused thereby. In this manner, this sealing is lengthened in a direction in which the temperature decreases. As a result, the material offers a long-term protection against the effect of fire and/or extreme heat. A part 26 of the material in the opening expands beyond the opening. A part 27 of the material on the surface of the part 26 will have a relatively low temperature, thereby expanding little and remaining intact thermally and mechanically.

Figure 10:
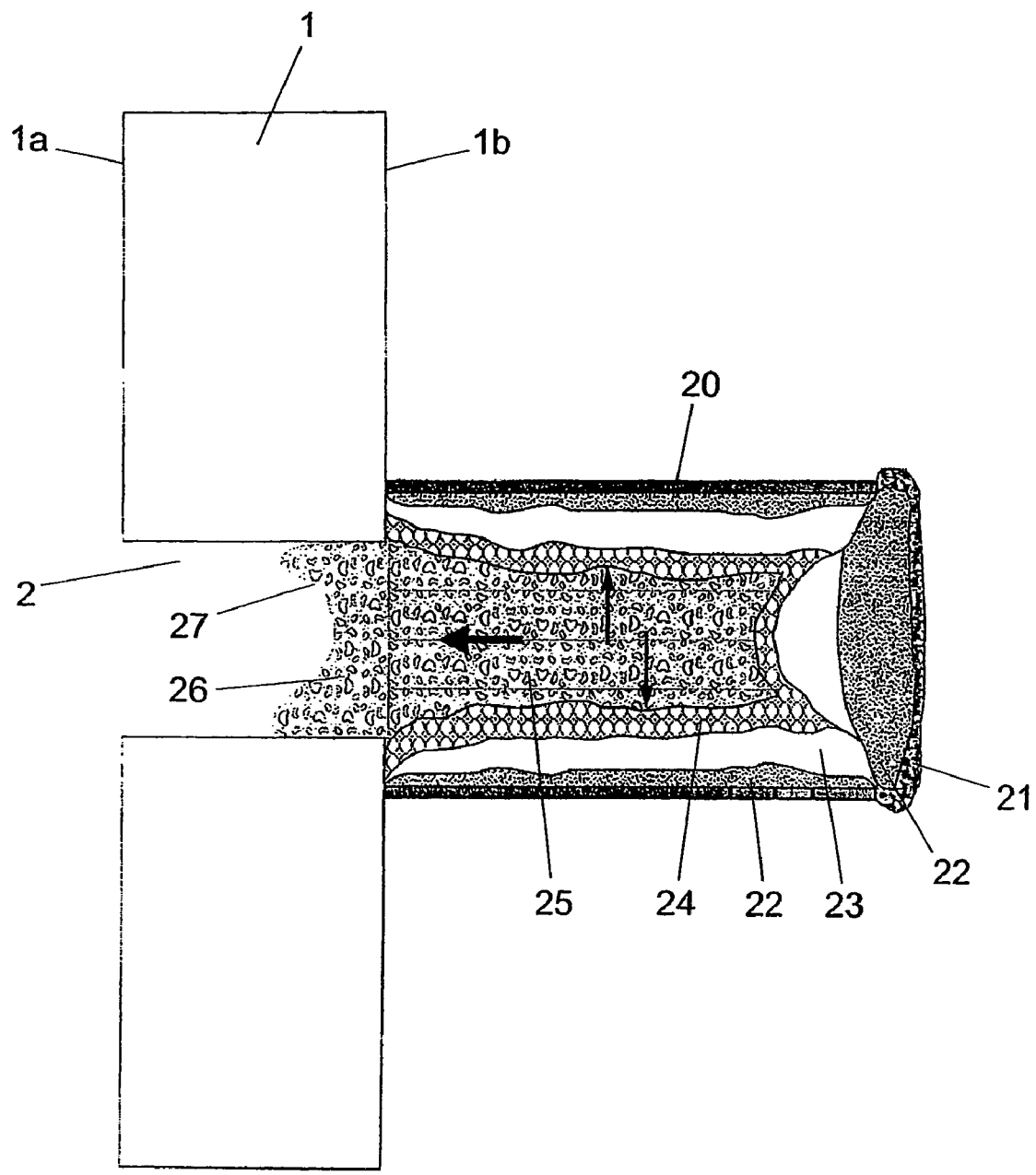
FIG. 10 shows a cross-section of a wall with an opening against which a casing with a material according to the invention is provided.

FIG. 10 shows a situation in which use is made of a casing 20 on the side exposed to the fire. The behaviour of the parts of the material with a reference numeral 2x (x=1, 2 ... 7) substantially corresponds to the behaviour of the parts having a corresponding reference numeral in FIG. 9.

A system according to the invention can also serve as a temporary sealing of a feed-through in a wall when building a construction comprising such walls, such as, for instance, a ship, a drilling platform or a chemical plant. During construction of such structures, due to an unfortunate mishap, a fire can break out in a space bounded by at least one wall with a feed-through. For instance, during welding operations, sparks can end up on inflammable material and cause a fire. What is meant by such a feed-through is an opening as shown in the Figures described hereinabove. Preferably, a feed-through is temporarily sealed off during construction of the structure, also before transporting devices comprising for instance a pipe, cable or duct are fed through the feed-through, in order to prevent a fire, having broken out in a space, from spreading to an adjoining space via the feed-through. Such a feed-through can also be temporarily sealed off to prevent smoke from spreading in case of a fire. Preferably, the sealing should be carried out such that, after the temporary sealing, at least parts of the system can be removed in a simple manner for the purpose of feeding the transporting device through the feed-through. Also, the arrangement is temporarily sealed off such that when a fire occurs adjacent the wall during the temporary sealing, the feed-through is sealed off at least virtually fire-tightly, and preferably also smoke-tightly.

Figure 11:
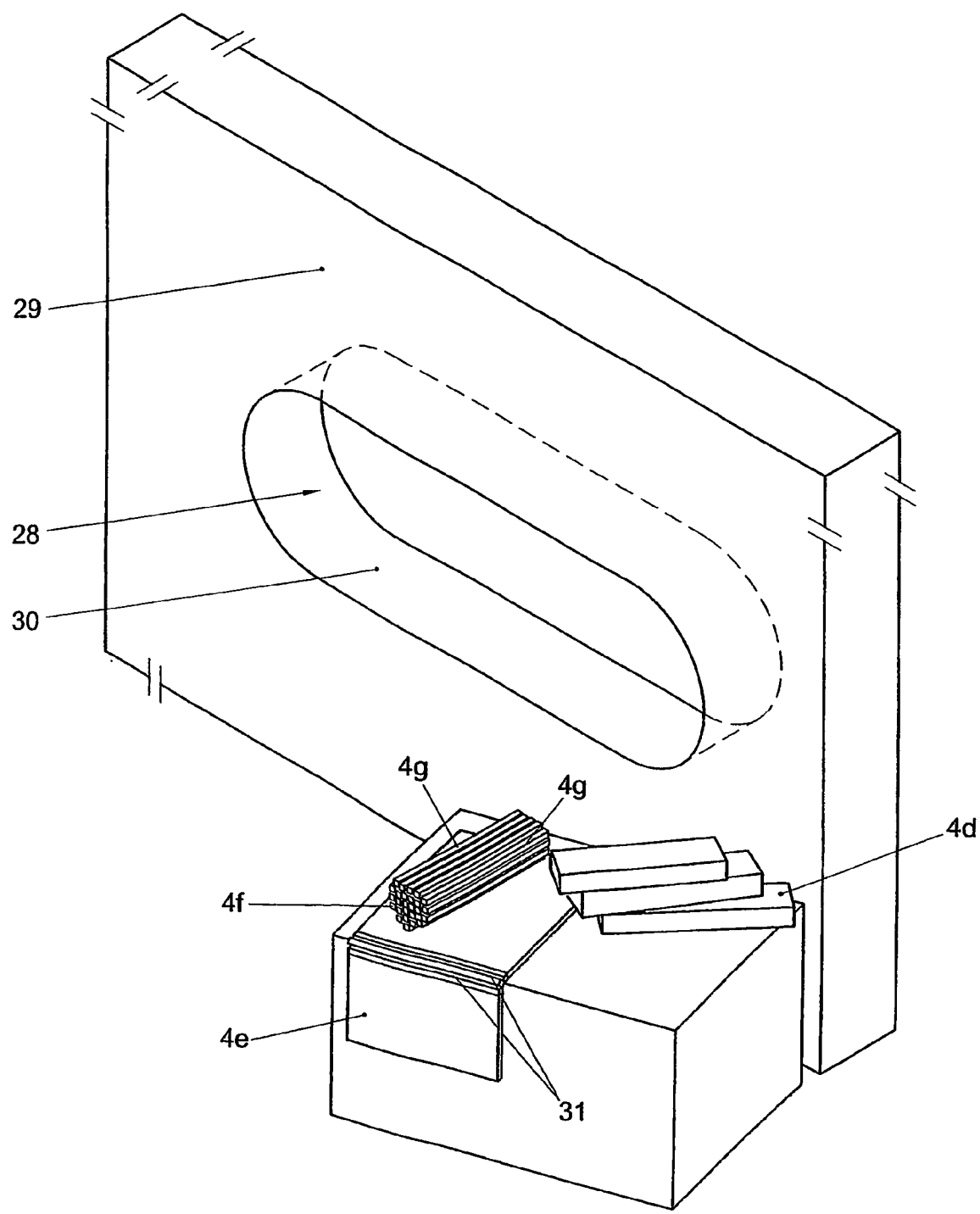
FIG. 11 shows a first phase of a second use of a system according to the invention.
Figure 12:
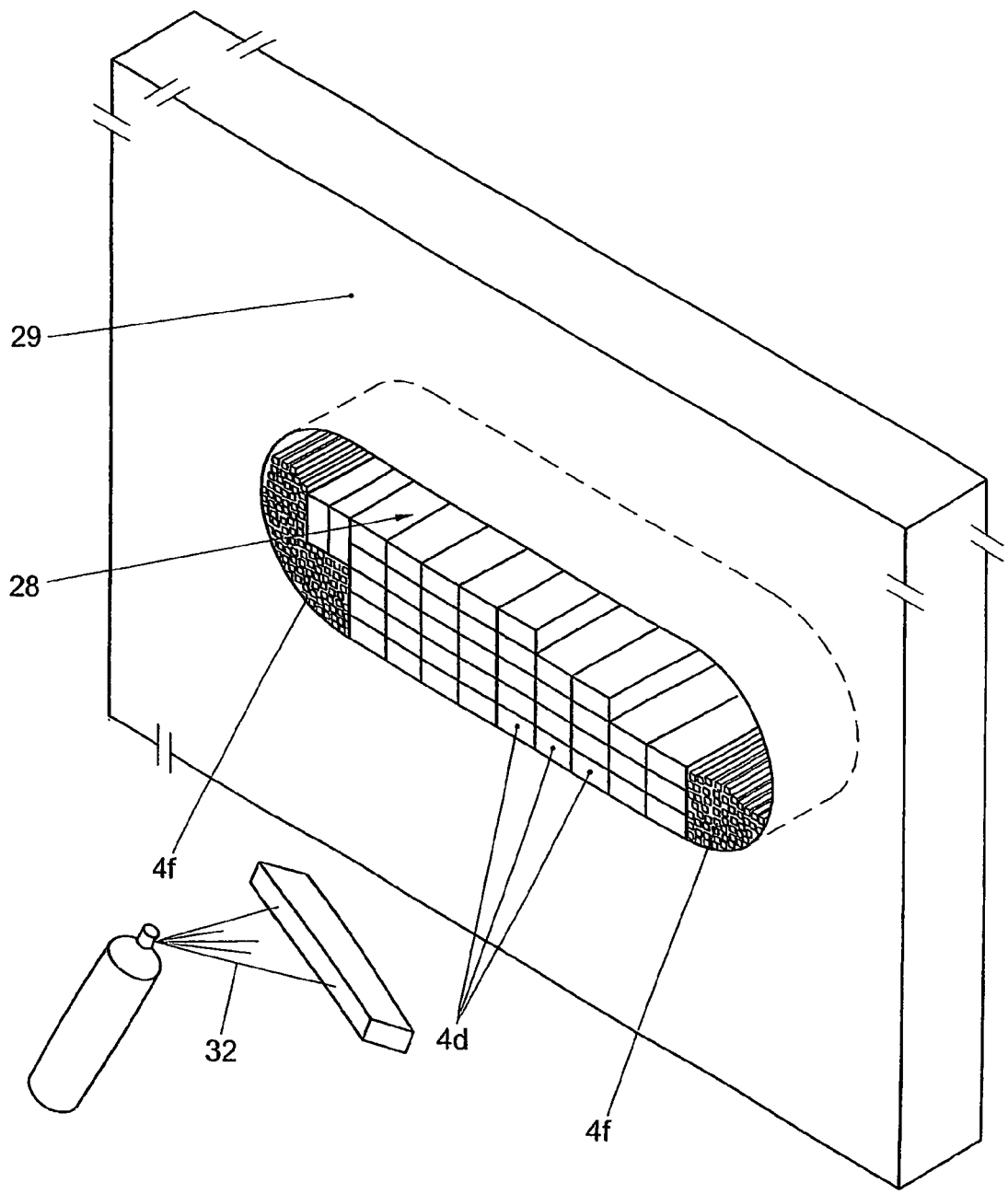
FIG. 12 shows a second phase of the second use of a system according to the invention.

FIG. 11 shows a first phase of such a use of a system according to the invention. Elements 4d, 4e, 4f are manufactured from a fire-resistant material which expands under the influence of temperature increase and are manufactured from the foam according to the invention, and are provided for the purpose of sealing-off a feed-through 28 in wall 29. As can be seen in FIG. 11, the feed-through 28 can be provided with inner walls 30 which are of circular design, at least partly. The plate-shaped element 4e is provided with lines of weakening 31 extending over one side of the plate-shaped element 4e and running parallel to each other. Preferably, such lines of weakening 31 comprise grooves extending from one side of the plate-shaped element through a thickness of the plate to a distance from the other side of the plate-shaped element. In that case, the plate-shaped element 4e can be rolled up in a direction at right angles to the direction of the lines of weakening 31. The grooves are then located on an outside of the plate-shaped element when this is in rolled up condition. An example of a plate-shaped element 4e rolled up accordingly is the element 4f as shown in FIG. 11. The plate-shaped or beam-shaped elements 4 can be introduced into the feed-through on positions where rectangular elements simply link up with the inner wall 30 of the feed-through 28. For the purpose of a fitting link-up with the inner wall 30, rolled up elements such as element 4f can be provided on positions where the inner wall 30 of the feed-through 28 has a rounded form. A preferred placing of the elements 4 and 4f can be seen in FIG. 12. For the purpose placing in a simple manner and also, when necessary, removing elements 4f, 4e, 4d in a simple manner, a few surfaces of such elements can be provided with a lubricant 32 optionally based on silicones and which can be applied, for instance, with the aid of the spray. It is recommended to provide such a lubricant only on parts of plate-shaped element 4e which, in rolled up condition, form and outer casing of the plate shaped element 4f, so that the mechanical stability of the plate-shaped element 4f in the rolled up condition remains intact through friction of parts on which no lubricant has been provided. It will be clear that the plate-shaped element 4e which is provided with grooves can also be used other than rolled up. Moreover, also strips 4g can be torn from such an element for use on positions in the feed-through where, after a plurality of the elements has been placed, further filling of the feed-through is only possible with one or a few strips 4g. Also, strips 4g can be taken from the element 4e to have the element 4e fit better. Naturally, the strips 4g can also be stacked as can be seen at reference numeral 32.

Figure 13:
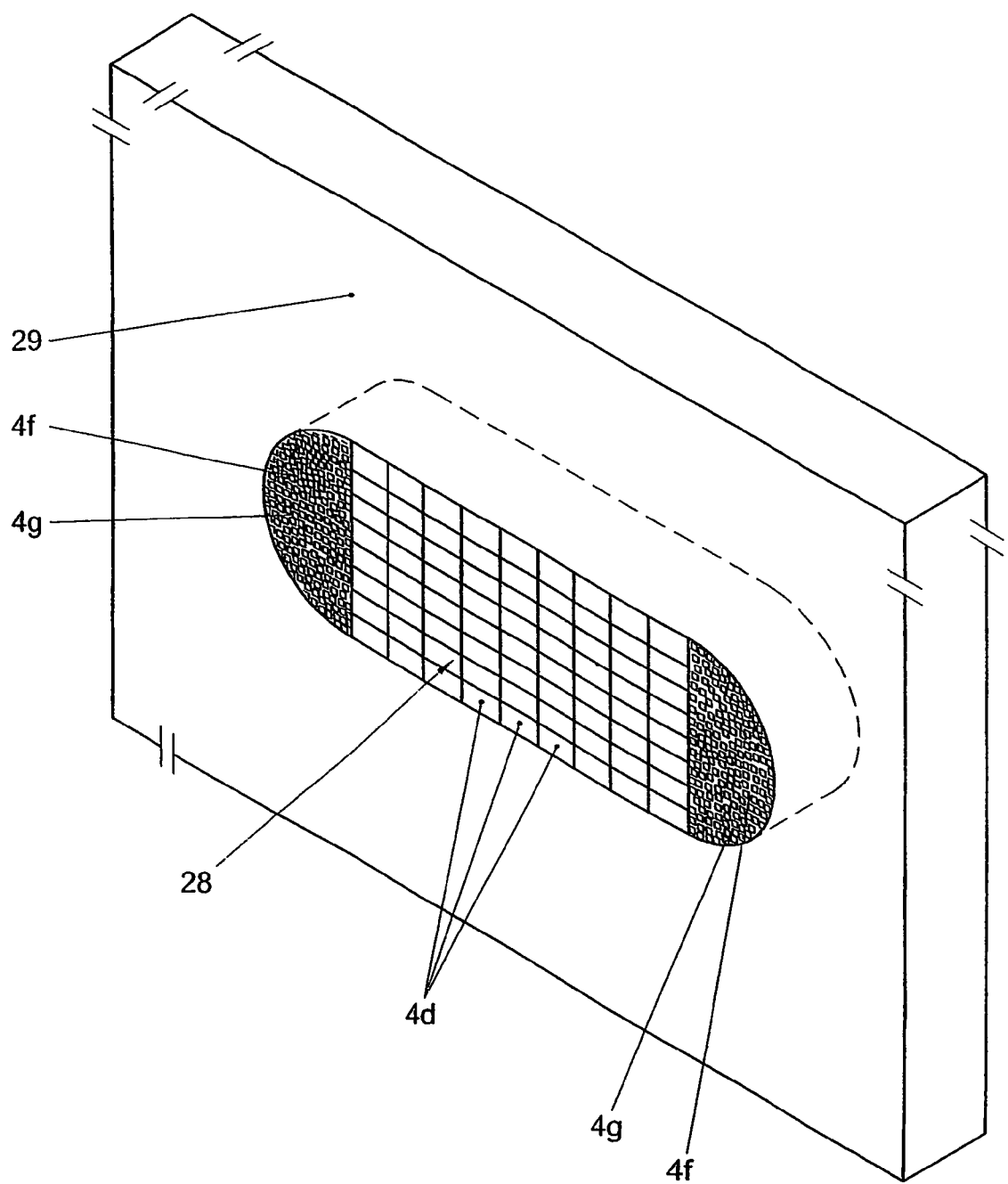
FIG. 13 shows a third phase of the second use of a system according to the invention.

In FIG. 13 it is shown how, with the aid of the elements 4e, 4f, 4g and 4d, the feed-through 28 can be filled up for the purpose of a temporary sealing.

Figure 14:
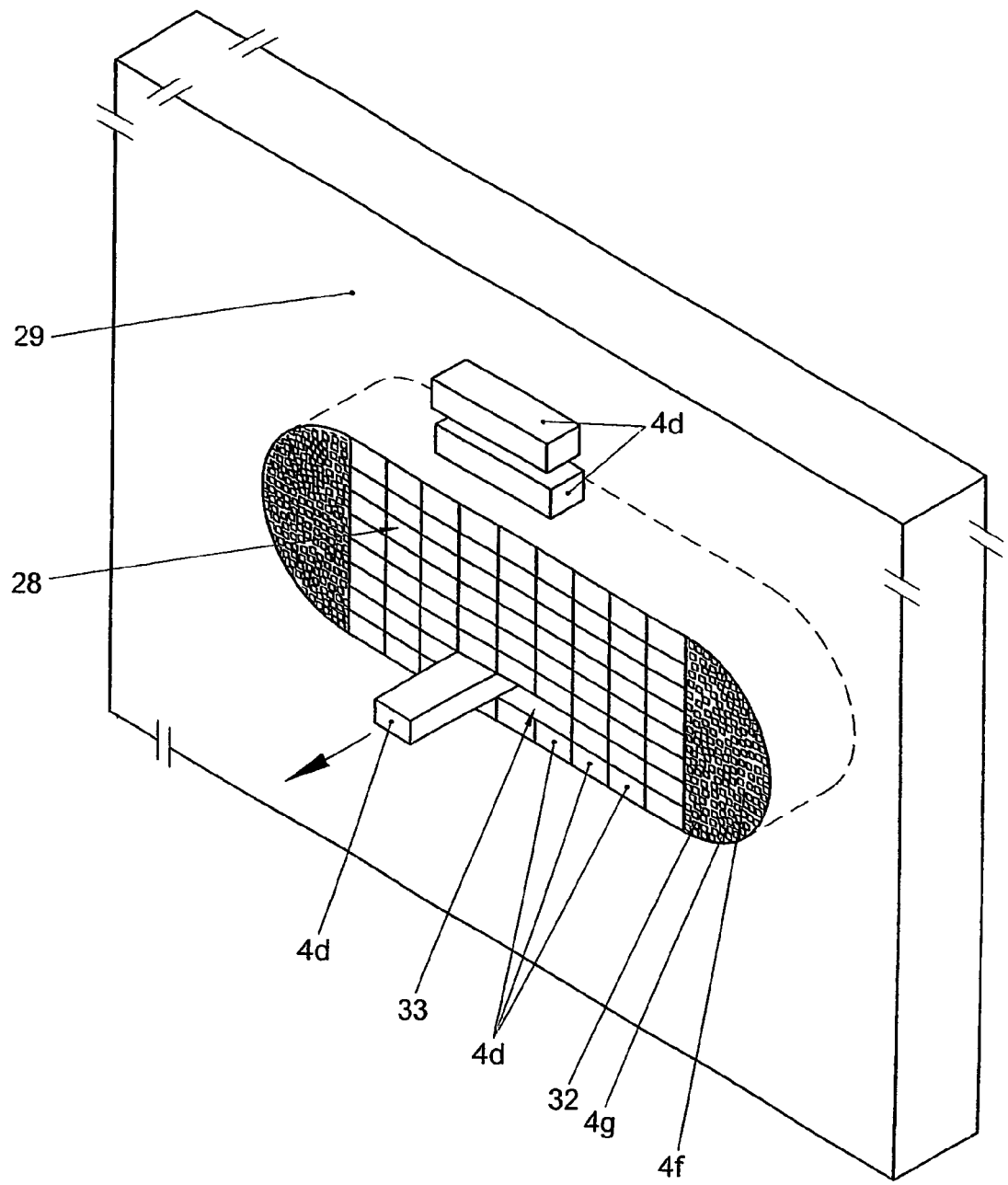
FIG. 14 shows a fourth phase of the second use of the system according to the invention.

In FIG. 14, it is shown how, in the passage 28 sealed with the elements, a recess 33 can be formed by removing at least one plate-shaped or beam-shaped element 4d. The plate-shaped and/or beam-shaped elements 4 located above the recess are clamped in by the other elements in the feed-through 28 such that no sagging occurs and, when removing the elements 4d, the recess 33 remains intact.

Figure 15:
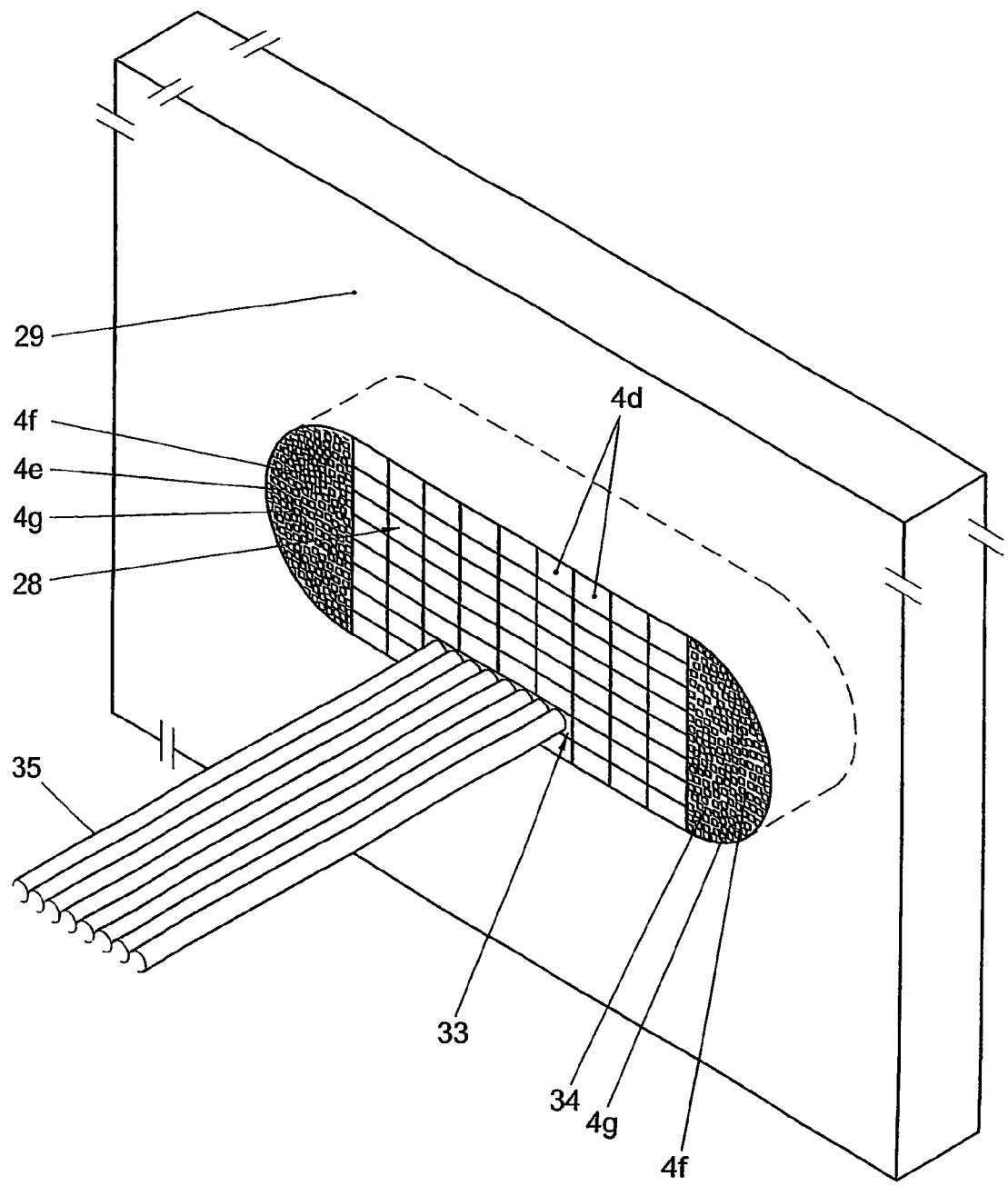
FIG. 15 shows a fifth phase of the second use of a system according to be invention.

FIG. 15 shows how through such a recess 33, for instance, cables 35 can be guided for the purpose of obtaining a feed-through through which a transporting device has been guided while the feed-through is sealed off such that with a fire taking place adjacent the wall, the feed-through is sealed off at least in a fire-tight, and preferably also smoke-tight manner. An advantage of such a use of the system according to the invention is that, directly after formation of the feed-through, the feed-through can be sealed off. Optionally, this can even happen before a wall is placed in a construction.

It will be clear that a plate-shaped element 4e is to be designed so as to be deformable and that this can be done, for instance, by providing the element with grooves 31. These can be provided on both sides of the element, lie opposite each other and, optionally, be rounded.

Presently, the invention is further elucidated with reference to the following, non-limitative example. As is the case in other parts of the description, percentages are percentages by weight calculated on the weight of the final foam product.

EXAMPLE 1

In a known manner, a foam was prepared from the following composition:

| | |
|---|---|
| Levapren 450* (an EVA polymer ex Bayer, Germany) | 52% |
| Mediaplast EV/F (ex Mediaplast, France, dispersant) | 3% |
| Zinc stearate | 2% |
| Apyral $2^E$ (aluminum hydroxide) or HNN336 by Huber | 25% |
| Antiblaze MC (ammonium polyphosphate) or Melapur 200 | 4% |
| pH neutralized Carbofoil L 120 | 14% |

*customary amount of blowing agent and cross linking agent included

The blowing agent is OBSH-75® and the cross-linking agent is Dicumylperoxide (DCP), and are used in 4 parts and 2.5 parts, respectively, at a temperature of approximately 170° C. for a duration of time of 6-10 minutes.

The foam obtained had a density according to ISO 2781 of 0.35-0.40 g/cm$^3$; a compression set (72 hours at 23° C., relaxation time 24 hours; based on ISO 815 of 14%; a thermal insulation (K-)value according to NEN-EN 12667 of 12 mk/W (10° C.); a LOI (limited oxygen index; ISO 4589-2) of 28%; an inflammation temperature index according to ISO 4589-3 of 202° C.; an indicative toxicity index according to NES 713 of 2.89; and a smoke index according to NES 711 of 137.

EXAMPLE 2

In a concrete wall of 1.6×1.6×0.15 m, forming the wall of an oven, an opening was made of 45×35 cm. In this opening, a construction as shown in FIG. 8 was provided. Foam plates (30×25×2.5 cm) of the material as described in Example 1 were provided around the cables and pipes. On one side, the oven side, the foam material was heated by fire for 90 minutes to a maximum temperature of approximately 950° C. (after two minutes, the temperature was already 570° C., after 20 minutes 775° C. and from 45 minutes onwards the temperature was over 900° C.).

What was found was that after 90 minutes, the other side of the foam structure (removed 25 cm from the fire side) had not become hotter than 90° C.

The invention claimed is:

1. A fire-resistant material comprising an elastomeric foam of cross-linked ethylene vinyl acetate (EVA) with a substantially closed cell structure, wherein the foam further comprises at least one crust-forming fire-retardant material and a pH neutralized graphite material, wherein the crust-forming fire-retardant material has been selected from poly ammonium phosphate and/or melamine phosphate, and wherein the crust-forming fire-retardant material is present in such an amount that a fire-retardant crust is formed on a side of the foam when directly exposed to high temperatures due to the presence of a fire, wherein the fire-retardant crust provides a shield against the effect of the fire.

2. A material according to claim 1, wherein the graphite material expands at a temperature higher than 200° C.

3. A material according to claim 1, in the form of a plate-shaped or beam-shaped element.

4. A system for sealing off, at least during a fire taking place adjacent a wall, in at least one of a virtually entirely flame-tight manner and smoke-tight manner, an opening extending through this wall, through which a transporting device comprising at least one of a cable, duct and pipe has been fed, the system being provided with elements manufactured from a fire-resistant material which expands under the influence of temperature increase, wherein the elements are manufactured from a fire-resistant material comprising an elastomeric foam of cross-linked ethylene vinyl acetate (EVA) with a substantially closed cell structure, wherein the foam further comprises at least one crust-forming fire-retardant material and a pH neutralized graphite material, wherein the crust-forming fire retardant material has been selected from poly ammonium phosphate and/or melamine phosphate, and wherein the crust-forming fire-retardant material is present in such an amount that a fire-retardant crust is formed on a side of the foam when directly exposed to high temperatures due to the presence of a fire, wherein the fire-retardant crust provides a shield against the effect of the fire.

5. A system according to claim 4, wherein the system is designed such that the elements can be fixed in a self-clamping manner in the opening or in a casing thereof through mutual contact, contact with an inner wall of the opening or contact with the transporting device.

6. A system according to claim 4, wherein the system can be substantially fixed within a volume which is bounded by a first outer surface of the wall and a second outer surface of the wall located opposite the first outer surface.

7. A system according to claim 4, wherein the system is designed such that after the system has been fixed in the opening, parts of the opening which are free from the transporting device are sealed off by the system.

8. A system according to claim 4, wherein the system is designed such that after fixation in the opening, the system is ready for use.

9. A system according to claim 4, wherein at least one of the elements is part of a plate-shaped material, which is provided with a line of weakening, the at least one element being detachable by breaking along the line of weakening in the plate-shaped material.

10. A system according to claim 4, wherein at least one of the elements is of tube-shaped design.

11. A system according to claim 4, wherein at least one of the elements is of plate-shaped design.

12. A wall with a feed-through, wherein the feed-through is at least temporarily sealed off with a system according to claim 4.

* * * * *